United States Patent
Littorin et al.

(10) Patent No.: US 9,067,959 B2
(45) Date of Patent: *Jun. 30, 2015

(54) METHOD FOR PRECIPITATING LIGNIN FROM BLACK LIQUOR BY UTILIZING WASTE GASES

(75) Inventors: Anders Littorin, Hisings Kärra (SE); Henrik Wallmo, Alingsås (SE); Hanna Kristina Karlsson, Göteborg (SE); Martin Wimby, Torslanda (SE)

(73) Assignee: VALMET POWER AB, Goteborg (SE)

( * ) Notice: Subject to any disclaimer, the term of this patent is extended or adjusted under 35 U.S.C. 154(b) by 537 days.

This patent is subject to a terminal disclaimer.

(21) Appl. No.: 13/375,901

(22) PCT Filed: Jun. 10, 2009

(86) PCT No.: PCT/SE2009/000291
§ 371 (c)(1),
(2), (4) Date: Apr. 29, 2013

(87) PCT Pub. No.: WO2010/143997
PCT Pub. Date: Dec. 16, 2010

(65) Prior Publication Data
US 2014/0275498 A1 Sep. 18, 2014

(51) Int. Cl.
D21C 9/00 (2006.01)
D21H 23/00 (2006.01)
C07G 1/00 (2011.01)
D21C 11/00 (2006.01)
D21C 11/04 (2006.01)

(52) U.S. Cl.
CPC .............. *C07G 1/00* (2013.01); *D21C 11/0007* (2013.01); *D21C 11/0085* (2013.01); *D21C 11/04* (2013.01)

(58) Field of Classification Search
CPC .................. D21C 11/0007; C02F 2103/28
USPC ............................................. 162/16; 210/928
See application file for complete search history.

(56) References Cited

U.S. PATENT DOCUMENTS

| 2,997,466 | A | * | 8/1961 | Ball et al. ....................... 530/500 |
| 3,048,576 | A | * | 8/1962 | Ball et al. ....................... 530/500 |
| 4,470,876 | A | * | 9/1984 | Beaupre et al. ................. 162/16 |
| 4,764,596 | A | * | 8/1988 | Lora et al. ..................... 530/507 |
| 4,764,597 | A | * | 8/1988 | Dilling ......................... 530/501 |
| 4,933,163 | A | * | 6/1990 | Fischer et al. ............. 423/574.1 |
| 5,635,024 | A | * | 6/1997 | Shall .............................. 162/16 |
| 6,183,598 | B1 | * | 2/2001 | Myreen ........................... 162/29 |
| 6,632,327 | B1 | * | 10/2003 | Shall .............................. 162/29 |
| 6,770,168 | B1 | * | 8/2004 | Stigsson ......................... 162/24 |
| 8,172,981 | B2 | * | 5/2012 | Tomani et al. ................. 162/16 |
| 2008/0047674 | A1 | * | 2/2008 | Ohman et al. .................. 162/16 |
| 2008/0051566 | A1 | * | 2/2008 | Ohman et al. ................ 530/500 |

(Continued)

*Primary Examiner* — Liam J Heincer
(74) *Attorney, Agent, or Firm* — Rolf Fasth; Fasth Law Offices

(57) ABSTRACT

The method is for separation of lignin from original black liquor. Lignin is precipitated in a first acidification stage followed by dewatering a first lignin suspension while forming a first filter cake. The first lignin filter cake is suspended in a second acidification stage whereupon a second lignin suspension is obtained. The second lignin suspension is dewatered to form a second filter cake. The second filter cake is washed and the washed second lignin cake is dewatered to obtain a lignin product. Waste gases from the second acidification stage is recirculated back to the first acidification stage and mixed with the original black liquor.

14 Claims, 2 Drawing Sheets

(56) References Cited

U.S. PATENT DOCUMENTS

| | | | |
|---|---|---|---|
| 2008/0214796 A1* | 9/2008 | Tomani et al. | 530/500 |
| 2010/0041879 A1* | 2/2010 | Stigsson et al. | 536/127 |
| 2010/0325947 A1* | 12/2010 | Ohman et al. | 44/606 |
| 2011/0294991 A1* | 12/2011 | Lake et al. | 530/500 |
| 2011/0297340 A1* | 12/2011 | Kouisni et al. | 162/16 |
| 2013/0203972 A1* | 8/2013 | Miettinen | 530/500 |

* cited by examiner

METHOD FOR PRECIPITATING LIGNIN FROM BLACK LIQUOR BY UTILIZING WASTE GASES

PRIOR APPLICATION

This application is a U.S. national phase application that is based on and claims priority from International Application No. PCT/SE2009/000291, filed 10 Jun. 2009.

TECHNICAL FIELD

This invention relates to a method for lignin separation from spent cooking liquor, called original black liquor, using a 2-stage acidic separation process.

BACKGROUND

The advantages with lignin separation from black liquor is already described in WO 2006/031175 and WO2006/038863. These patents disclose the novel process LignoBoost™ that is now sold by Metso, and wherein WO 2006/031175 disclose the basic two stage acidic process and WO2006/038863 disclose an improvement of the process where sulphate or sulphate ions are added to the process.

An important aspect of the process is that the required charge of chemicals for the acidification may be high. If this is the case the cost of fresh chemicals is a large part of the operational cost and the commercial viability of the process is lower. These problems could be reduced, if the process is optimized for minimum requirement for charges of fresh chemicals, making the lignin product commercially sound.

Another problem with the process disclosed in WO 2006/031175 is that there may be a disposal problem with the strongly odorous $H_2S$ gases that are emitted from the reslurrying tank and bled out from the process, and it is suggested that these hydrogen sulfides could be added to the pulping process in order to increase sulfidity and possibly increase the yield in the pulping process. However, such rerouting of the strongly odorous $H_2S$ gases to another part of the pulp mill introduces risks for emissions of these gases during transport and storage. It is far better to use these gases at the location or process producing these gases.

SUMMARY OF THE INVENTION

The invention is based upon the finding that the $H_2S$ gases that are emitted from the reslurrying tank also contains a large amount of residual carbon dioxide, $CO_2$. By re-circulating this $H_2S$ and $CO_2$ rich gas back to the first acidification stage a corresponding reduction of addition of the fresh carbon dioxide is obtained.

The carbon dioxide formed in the reslurrying tank, originates from the sulphides and carbonates content in the lignin cake. These compounds reacts with the acidifier and forms carbon dioxide ($CO_2$) and hydrogen sulfide ($H_2S$), according to:

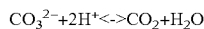

$CO_3^{2-}+2H^+ <-> CO_2+H_2O$

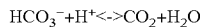

$HCO_3^- + H^+ <-> CO_2+H_2O$

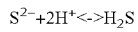

$S^{2-}+2H^+ <-> H_2S$

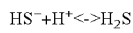

$HS^- + H^+ <-> H_2S$

The formation of carbon dioxide in this process enables a further source for carbon dioxide needed for the first acidification stage, and the hydrogen sulfide is also a net contributor to the acidification as the $pK_a$ value of hydrogen sulfide is 6,89.

This invention relates to a two-stage acidic separation process and the scientific definition of acidity is as follows. Reactions of acids are often generalized in the form HA H⁺+A⁻, where HA represents the acid and A⁻ is the conjugate base. Acid-base conjugate pairs differ by one proton, and can be interconverted by the addition or removal of a proton (protonation and deprotonation, respectively). Note that the acid can be the charged species and the conjugate base can be neutral in which case the generalized reaction scheme could be written as HA⁺ H⁺+A. In solution there exists equilibrium between the acid and its conjugate base. The equilibrium constant K is an expression of the equilibrium concentrations of the molecules or ions in solution. Brackets indicate concentration, such that [$H_2O$] means the concentration of $H_2O$. The acid dissociation constant $K_a$ is generally used in the context of acid-base reactions. The numerical value of $K_a$ is equal to the concentration of the products over the concentration of the reactants, where the reactant is the acid (HA) and the products are the conjugate base and H⁺. The stronger of two acids will have a higher $K_a$ than the weaker acid; the ratio of hydrogen ions to acid will be higher for the stronger acid as the stronger acid has a greater tendency to lose its proton. Because the range of possible values for $K_a$ spans many orders of magnitude, a more manageable constant, $pK_a$ is more frequently used, where $pK_a=-\log_{10}(K_a)$. Stronger acids have a smaller $pK_a$ than weaker acids. Experimentally determined $pK_a$ at 25° C. in aqueous solution are often quoted in textbooks and reference material. This value of the $pK_a$ is used in following description of the weak and strong acids used. As a comparison the $pK_a$ value for water is 15.7.

It is intended throughout the present description that the expression weak acid embraces any acidifier comparable to carbon dioxide in aspects of acidic strength, i.e. a positive $pK_a$ number in the order of 1-15, preferably 5-12. Often is carbon dioxide the preferred choice for the weak chemical as it is a low impact on environmental loading, and has a well proven capability of improving wash-out performance in wash stages and improves drain ability of the lignin cake. Carbon dioxide is also relatively inexpensive and would not introduce new chemicals into the liquor cycle of the pulp mill. This weak acid is used in the first separation stage of the invention, as the volumes of black liquor are considerable.

It is intended throughout the present description that the expression strong acid embraces any acidifier comparable to sulfuric acid in aspects of acidic strength, i.e. a $pK_a$ number in the order of −3, i.e. in the negative range and preferably in the range −1 to −5. An alternative strong acidifier could be found in acidifying is performed by adding SO2(g), organic acids, hydrochloric acid (HCl), nitric acid ($HNO_3$), hydroiodic acid (HI), hydrobromic acid (HBr) or perchloric acid (HCLO4), even if the alternatives with chlorides most often is less preferred due to environmental load. The fresh sulfuric acid added to the process could be obtained from so called "spent acid" from a chlorine dioxide generator or fresh sulfuric acid from a chemical supplier, or mixtures thereof.

The present invention solves above problems, both the disposal problem of the odorous sodium sulfide as well as a reduced charge of acidifier in the first acidification stage.

It is intended throughout the present description that the expression "dewatering" embraces any means of dewatering. Preferably the dewatering is performed by using centrifugation, a filter press apparatus, a band filter, a rotary filter, such as a drum filter, or a sedimentation tank, or similar equipment, most preferred a filter press apparatus is used.

It is intended throughout the present description that the expression "original black liquor" embraces spent cooking liquor from a digester, having most of the lignin from the original cellulose material dissolved in the "original black liquor". The "original black liquor" may also have a large content of organic and inorganic material, but may also have passed through separation processes for extracting turpentine or other specific constituents, while keeping the bulk volume of dissolved lignin unaltered.

According to the basic aspects of the inventive method it is related to separation of lignin from original black liquor comprising the following stages in sequence:
- a) Precipitation of lignin by a first acidification stage of the original black liquor by adding a first acid
- b) followed by dewatering while forming a first filter cake with high content of lignin,
- c) suspending the first lignin filter cake obtained in stage b in a second acidification stage using a second acid,
- d) whereupon a second lignin suspension is obtained,
- e) dewatering of the second lignin suspension forming a second filter cake with high content of lignin,
- f) washing the second filter cake and finally,
- g) dewatering of the washed second lignin cake obtaining a lignin product. The improvement according to the inventive process is that the waste gases emitted from the second acidification stage is re-circulated and mixed with the original black liquor at the latest in the first acidification stage.

In an embodiment of the invention the waste gases emitted from the second acidification stage are treated in a conversion process wherein at least a part of the waste gas components is converted to a stronger acid having a lower $pK_a$ value before being re-circulated and mixed with the original black liquor. The conversion process preferably takes place in a combustion chamber wherein the combustion is assisted with air or oxygen supply. In this embodiment could also the waste gases emitted from the second acidification stage be collected by a pump that establish a sub atmospheric pressure during the second acidification stage in order to increase degassing and collection of all gases emitted and avoid leakage of odorous gases to the environment.

In a preferred embodiment of the inventive method is the first acid a weak acid having a positive $pK_a$, preferably carbon dioxide. As the first acid is used in the total volume of black liquor treated, the amount of acidifier needed is extensive, and a cost effective and yet environmental friendly acidifier that also do not add any dangerous chemicals into the liquor cycle is preferable. This would, however, not exclude the possibility of using the same acidifier as used as the second acid under the basic aspects of the invention.

In yet a preferred embodiment of the inventive method is the second acid a strong acid having a negative $pK_a$, preferably sulfuric acid. As the second acid is used in the relurrying stage of the first lignin cake, the amount of acidifier needed is dramatically reduced as the total volume of the lignin cake is less than $1/10$ of the original black liquor volume. This would not exclude the possibility of using the same acidifier as used as the first acid under the basic aspects of the invention.

In a further preferred embodiment of the inventive method is the entire separation process, from the first acidification stage and until obtaining the final lignin product, kept at acidic conditions below pH 6. Preferably the entire separation process from the first acidification stage is kept at acidic conditions even below pH 4. The pH level throughout the process is most preferred a pH from 1 to 3.5. This would prevent any separated lignin from being dissolved again, and the precipitated lignin would be subjected to repeat leaching of metals and other unwanted components, meeting the objectives of obtaining a clean lignin product at high yield.

In yet a further preferred embodiment of the inventive method is at least the dewatering of stage b) but possibly also stage f) including blowing trough of the first, or second, filter cake by gas or a mixture of gases, preferably flue gases, air or vapor, most preferred air or overheated vapor, in order to dispose of the remaining black liquor. This gas could also be re-circulated to the original black liquor if needed, as these gases may contain components that have a net contributing effect upon the acidification.

The inventive method may also include the additional steps of combining the pH level adjustment with an adjustment of the ion strength, preferably by using alkali metal ions or alkaline earth metal ions, most preferred calcium ions.

The inventive method may also include the additional steps of that at least a part of the filtrate from the dewatering in step g), or filtrate from washing in step f) is returned to the second acidification stage c) to further reduce the consumption of acid and water.

DETAILED DESCRIPTION OF THE INVENTION

Figure 1:
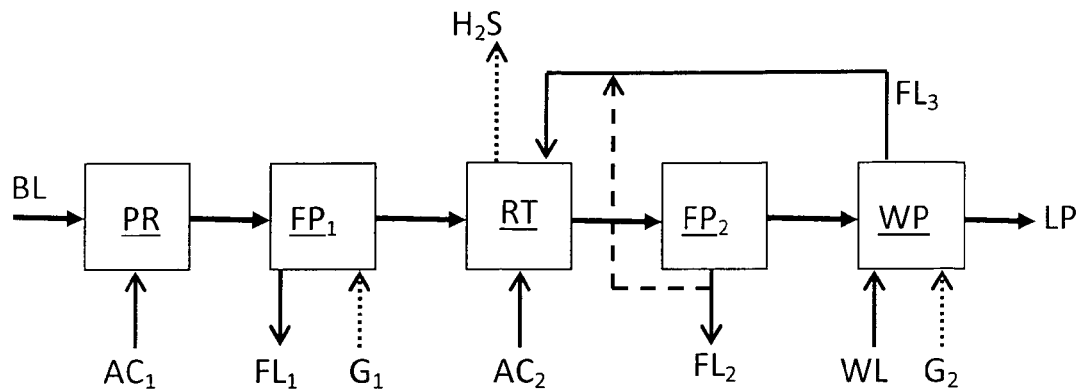
FIG. 1 shows the prior 2-stage lignin separation process according to WO 2006/031175.

In FIG. 1 is the known prior art process according to WO 2006/031175 shown. The separation of lignin from original black liquor BL comprising the following stages in sequence:
- a) Precipitation of lignin by a first acidification stage of the original black liquor by adding a first acid or mixture of acids $AC_1$, in any suitable precipitation reactor PR,
- b) followed by dewatering while forming a first filter cake with high content of lignin, said dewatering made in any suitable filter press $FP_1$, which may drain a first filtrate $FL_1$ from the lignin suspension and have addition of gas blow trough G, of the lignin cake in order to displace any residual acidic liquor,
- c) suspending the first lignin filter cake obtained in stage b in a second acidification stage using a second acid or mixture of acids $AC_2$, said suspension made in any suitable reslurry tank RT while discarding the odorous gases $H_2S$ emitted,
- d) whereupon a second lignin suspension is obtained in the reslurry tank RT,
- e) dewatering of the second lignin suspension forming a second filter-/lignin cake with high content of lignin, said dewatering made in any suitable filter press $FP_2$, which may drain a second filtrate $FL_2$ from the lignin suspension, and at least a portion of this second filtrate $FL_2$ may be re-circulated back to stage c,
- f) washing the second filter cake, said washing made in any suitable wash apparatus WP, adding a wash liquid WL to this washing stage, and finally
- g) dewatering of the washed second lignin cake obtaining a lignin product LP, said dewatering preferably made in the last stages of the wash apparatus WP, which may drain a third filtrate $FL_3$ from the second filter/lignin cake, and at least a portion of this second filtrate $FL_2$ may be re-circulated back to stage c, and may also have addition of gas blow trough $G_2$ of the lignin cake in order to displace any residual acidic liquor.

Figure 2:
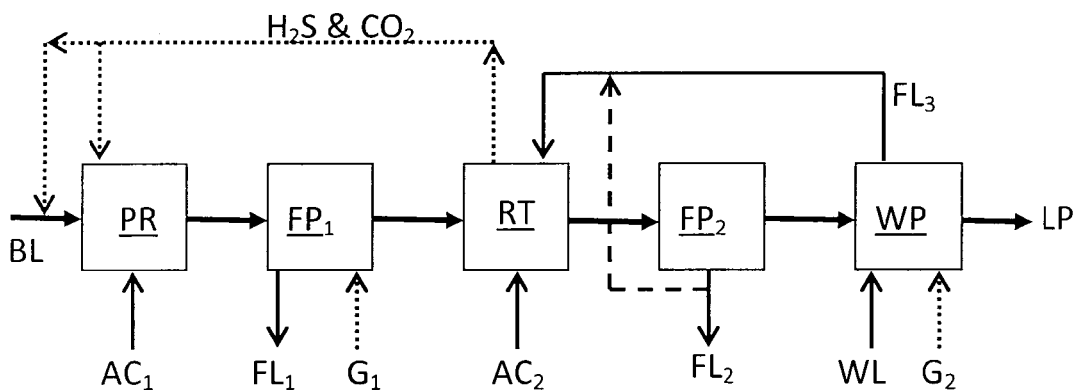
FIG. 2 shows the inventive modification of the 2-stage lignin separation process of the present invention.

In FIG. 2 is the inventive improvement of the prior art process according to WO 2006/031175 shown. The separation of lignin from original black liquor BL comprises the same basic steps as shown in FIG. 1, but here the waste gases emitted from the second acidification stage, i.e. from reslurrying tank RT, is re-circulated and mixed with the original black liquor at the latest in the first acidification stage.

The filtrate from the first dewatering stage in $FP_1$ is preferably re-circulated directly to a recovery system, preferably after re-alkalization.

The gas used in $FP_1$ or WP for blowing through the filter cake is preferably air or flue gases, preferably flue gases from a recovery boiler, a bark boiler or a lime kiln.

Figure 3:
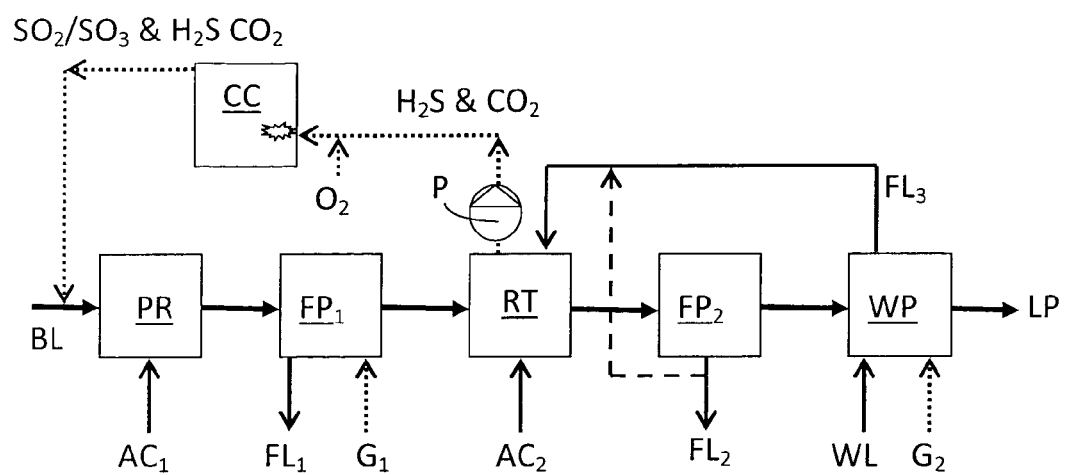
FIG. 3 is a schematic view of an alternative embodiment of the process of the present invention.

In FIG. 3 is an alternative embodiment of the inventive improvement of the prior art process according to WO 2006/031175 shown. Here is the re-circulated gas from the reslurring stage in RT passed to an oxidization reactor where the gas is oxidized with or without a catalyst in a combustion process with a flame in an oxidation reactor OR, while being added with oxygen, $O_2$. In such oxidization a conversion of the $H_2S$ to Sulfur dioxide or Sulfur trioxide takes place, which in a water solution have a stronger acidity than $H_2S$. The oxidation reactor could alternatively be a catalytic process or a combination of a combustion and a catalytic process similar to a sulfuric acid production process. The acidic strength of $H_2SO_3$ and $H_2SO_4$ corresponds to $pK_a$ values in the order of 1.8 and −3, respectively. If a large part of the $H_2S$ is converted to $SO_2$ and/or $SO_3$, then the need for charging fresh carbon dioxide decreases even further in order to establish the low pH value for the lignin precipitation. The savings in charge of fresh carbon dioxide could then be reduced by some 10-20% further, depending upon the conversion efficiency in the oxidization and total amount of $H_2S$ sent to the combustion chamber. The gases from the reslurring stage in RT could preferably be collected by a vacuum pump P, pressurizing the gases and positively assuring that all emitted gases from the reslurrying tank is vented away. As oxygen/air may be included in the stream of gases, due to slight sub atmospheric pressure in reslurrying tank, it would be advantageous to add the treated gases before charging the carbon dioxide to the original black liquor, i.e. in the in feed pipe to precipitation reactor PR as shown in figure, or any other suitable vessel.

An additional procedure for stabilizing the lignin during the 2-stage process is, in combination with a pH-decrease, to adjust the ionic strength in the slurry stage, preferably with multivalent alkali metal ions or alkaline earth metal ions (e.g. calcium). At a given pH, a higher ionic strength in the suspension stage reduces the lignin yield losses. Here also the ionic strength and pH of the wash water preferably essentially correspond to the conditions in the slurry stage to avoid gradients during the washing process. A higher ionic strength in the slurry and in the wash water gives a stable lignin and high lignin yield even at pH-values in the upper acidic range.

The method according to the first aspect of the present invention may further be performed, as set out above, whereby first the lignin is precipitated with carbon dioxide or other suitable acids according to previously known methods. The suspension is then dewatered in some form of separation equipment (e.g. some form of filtration equipment, sedimentation tank, centrifugation etc). A filter press equipment where the filter cake can be pressed to a high dry content is preferable. Thereafter, air is preferably blown through the pressed filter cake in order to remove as much as possible of the remaining black liquor. In this way, the acid consumption and hydrogen sulfide formation in the subsequent re-slurry stage can be considerably reduced.

The filter cake is reslurried in tank RT preferably equipped with a suitable stirring device and equipped with an exhaust to take care of the hydrogen sulfide formed as well as residual and formed carbon dioxide.

EXAMPLES

Example 1

Comparative

In the prior art process shown in FIG. 1 was an original black liquor used with a dry matter concentration of 30% and at a feed rate of 4790 t/day, and where the final lignin product had a dry matter concentration of 70% at a production rate of 348 t/day.

Following charges was made in the process:

| Charge of Fresh $CO_2$ (ton/day) | Filtrate ($FL_1$) (ton/day) | Charge of $H_2SO_4$ ($m^3$/day) | Filtrate ($FL_2$) (ton/day) | Wash Liquor (WL) (ton/day) |
|---|---|---|---|---|
| 120 | 4441 | 12 | 541 | 541 |

As shown in the figure was the charge proportions of fresh carbon dioxide more than ⅓ (>33%) of the produced final lignin product, i.e. charge of 120 ton per 348 ton of final lignin product.

As the costs for carbon dioxide is almost 100 Euro per ton, the costs for chemicals then a great part of the production costs for the final lignin product.

Example 2

The Invention

If the process instead is modified according to the invention, using re-circulation of the gases emitted in the reslurrying stage, as shown in FIG. 2, but using the same original black liquor with a dry matter concentration of 30% and at a feed rate of 4790 t/day, and where the final lignin product had a dry matter concentration of 70% at a production rate of 348 t/day following charges was made in the process:

| Charge of Fresh $CO_2$ (ton/day) | Filtrate ($FL_1$) (ton/day) | Charge of $H_2SO_4$ ($m^3$/day) | Filtrate ($FL_2$) (ton/day) | Wash Liquor (WL) (ton/day) |
|---|---|---|---|---|
| 78 | 4441 | 12 | 541 | 541 |

As shown in the figure was the charge proportions by weight of fresh carbon dioxide reduced to about ⅕ (22%) of the produced final lignin product, i.e. a charge of 78 ton per 348 ton of final lignin product. The actual charge of carbon dioxide was reduced by 35% in comparison with the prior art process without recirculation of emitted gases from the reslurrying stage.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods can be combined with other known methods for separating lignin from black liquor using equivalent weaker or stronger acids. Other aspects, advantages and modifications within the scope of the invention will be apparent to those skilled in the art to which the invention pertains.

While the present invention has been described in accordance with preferred compositions and embodiments, it is to be understood that certain substitutions and alterations may be made thereto without departing from the spirit and scope of the following claims.

The invention claimed is:

1. A method for separation of lignin from original black liquor, comprising:
   precipitating lignin in a first acidification stage of an original black liquor by adding a first acid or mixture of acids and obtaining a first lignin suspension,
   dewatering the first lignin suspension while forming a first filter cake with a high content of lignin,
   suspending the first filter cake in a second acidification stage using a second acid or mixture of acids,
   obtaining a second lignin suspension,
   dewatering the second lignin suspension while forming a second filter cake with a high content of lignin,
   washing the second filter cake,
   dewatering of the washed second filter cake and obtaining a lignin product,
   re-circulating waste gases emitted from the second acidification stage, and
   mixing the waste gases with the original black liquor.

2. The method according to claim 1 wherein the waste gases are treated in a conversion process wherein at least a part of waste gas components is converted to a stronger acidity having a lower $pK_a$ value compared to an acidity and $pK_a$ value of the waste gases before being re-circulated and mixed with the original black liquor.

3. The method according to claim 2 wherein the conversion process takes place in a combustion chamber wherein a combustion is assisted with an air or oxygen supply.

4. The method according to claim 2 wherein the conversion process takes place in an oxidization reactor with a catalyst with or without a flame.

5. The method according to claim 1 wherein the waste gases are collected by a pump that establishes a sub-atmospheric pressure during the second acidification stage.

6. The method according to claim 1 wherein the first acid is a weak acid having a positive $pK_a$.

7. The method according to claim 6 wherein the second acid is a strong acid having a negative $pK_a$.

8. The method according to claim 7 wherein a separation process from the first acidification stage until obtaining the lignin product is kept at acidic conditions below pH 6.

9. The method according to claim 8 wherein the separation process from the first acidification stage is kept at acidic conditions below pH 4.

10. The method according to claim 1 wherein at least the dewatering of the first lignin suspension comprises blowing through the first filter cake of the second filter cake by gas or a mixture of gases.

11. The method according to claim 1 wherein a pH level adjustment is combined with an adjustment of an ion strength.

12. The method according to claim 1 wherein at least a part of a third filtrate obtained from washing the second filter cake is returned to the second acidification stage to further reduce a consumption of acid and water.

13. The method according to claim 1 wherein the method further comprises re-circulating the waste gases to the first acidification stage.

14. The method according to claim 1 wherein the method further comprises re-circulating a first portion of the waste gases to the first acidification stage and a second portion of the waste gases are mixed with the original black liquor.

* * * * *